United States Patent [19]

Righi

[11] 3,752,488

[45] Aug. 14, 1973

[54] CASSETTE TAPE READ OUT DEVICES

[76] Inventor: Nardino Righi, via Maniago, 2, Milan, Italy

[22] Filed: Apr. 9, 1971

[21] Appl. No.: 132,669

[30] Foreign Application Priority Data

Apr. 14, 1971 Italy........................23275 A/70

[52] U.S. Cl. ................................................ 274/4 E

[51] Int. Cl. ............................................ G11b 5/86

[58] Field of Search .................................... 274/4 E; 242/197–201

[56] References Cited

UNITED STATES PATENTS

| | | | |
|---|---|---|---|
| 3,445,116 | 5/1969 | Knox | 274/4 A |
| 3,628,754 | 12/1971 | Fujikawa | 274/4 E |
| 3,646,611 | 2/1972 | Ikeda | 274/4 E |
| 3,394,898 | 7/1968 | Laa | 274/4 E |
| 3,583,656 | 8/1971 | Protas | 274/4 E |

*Primary Examiner*—Harry N. Haroian
*Attorney*—Walter Becker

[57] ABSTRACT

A cassette tape read out device comprising a cartridge support frame which may be rotated by a slight downward manual pressure to the removal position for a previously inserted cartridge; the device also comprising a spring-biased hooking swinging member, serving to stop the frame in its operating positions.

3 Claims, 4 Drawing Figures

INVENTOR
Nardino Righi
BY
Walter Becker

CASSETTE TAPE READ OUT DEVICES

This invention relates to cassette tape read out devices and more particularly to such tape read out devices automatically operated by inserting a cartridge containing a recorded magnetic tape.

The tape read out device according to the invention substantially comprises a support plate on which a frame is pivoted for cartridge insertion and supporting a magnetic reading head suitably connected to the electric circuit for the readout device. Said frame, as pivoted at one of its ends, is angularly movable between an upper position where the cartridge is inserted or ejected and a lower position where the cartridge is completely inserted. Moreover, the read out device is provided with a hooking means which is operated upon cartridge insertion and engages with and disengages from said frame as the latter moves between its upper and lower positions, the passage from lower position to upper position of the frame for cartridge removal being caused by a slight pressure on a projecting portion of the case and cartridge ejection being caused by said hooking means on its backward movement.

The invention will be described in further detail by reference to the appended drawings, in which.

Figures 1, 2:
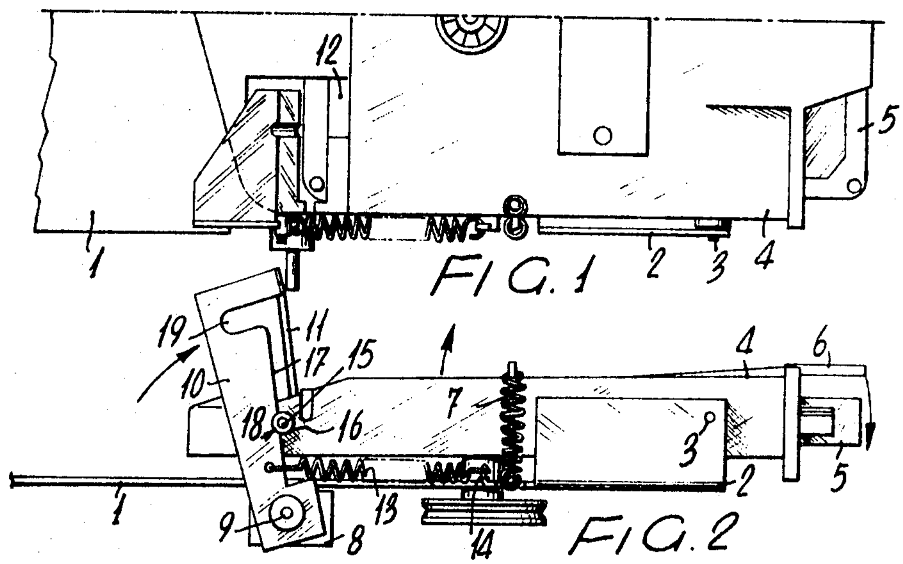
FIG. 1 is a fragmentary plan view showing a tape read out device according to the invention, where the cartridge is completely inserted.
FIG. 2 is a side view of FIG. 1.
Figure 3:
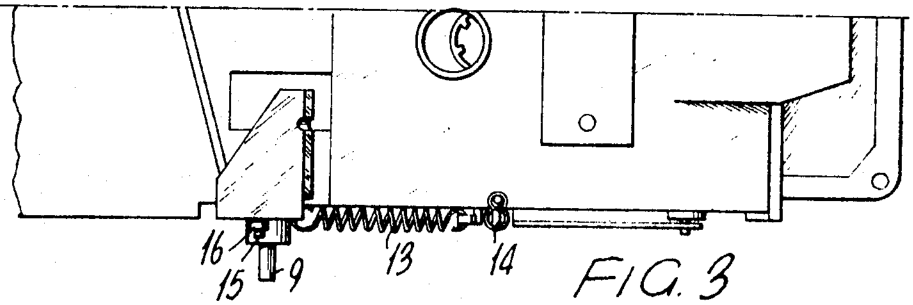
FIG. 3 is a fragmentary plan view showing the device of FIG. 1, where the cartridge is partially inserted.

Referring to the drawings, it will be seen that the tape read out device according to the invention substantially comprises a support plate 1 having a pair of side end tabs 2 (only one of which shown in the drawings, since FIGS. 1 and 3 are plan views showing only half of the device according to the invention), a frame 4 being pivoted at axis 3 to said side tabs 2, this frame 4 accomodating by insertion a general cartridge 5 containing the magnetic tape to be listened to or read by a magnetic head (not shown) carried by said frame 4.

Said frame 4 is pivoted in axis 3 at a location thereof adjacent the insertion end for cartridge 5, and at said end has a projecting portion 6 capable of being manually acted upon, by exerting a downward pressure or in the direction of the arrow shown in FIG. 2, for ejecting a cartridge, as it will be explained subsequently herein. A tension spring 7, hooked by one of its ends to said frame 4 and by its other end to plate 1, is effective for pulling the frame 4 downwardly to its lower position shown in FIG. 2.

Said plate 1 also has a further downward facing side tab 8, the end being pivoted thereto at axis 9 relative to an arm 10 of a swinging member for hooking said frame 4 and substantially in the form of an inverted U, the other arm 11 thereof entering the frame 4 through a suitable end aperture 12 and being adapted to be engaged by the inner end edge of an inserted cartridge 5.

Adjacent the pivot point or axis 9, one end of a tension spring 13 is also connected to the hooking swinging member, whereas the other end of this spring 13 is connected to a side hook 14 of the support plate 1. Said spring 13 is effective to draw the above mentioned U-shaped hook member to its forward position for engagement with frame 4, as clearly shown in FIG. 4 of the appended drawings.

Thus, as shown in the drawings, at its inner end said frame 4 has a side post 15 carrying a roller 16 sliding against or adhering to the shaped edge 17 of arm 10 of said hooking swinging member when removing or inserting a cartridge 5. At its intermediate portion, the edge 17 of said arm 10 has a notch or recess 18, wherein said roller 16 can be accomodated for forming a detent of frame 4 at its lower position and at the top said arm 10 also has a recess or seat 19 wherein said roller 16 is completely inserted for hooking and stopping the frame 4 at its upper position, as clearly shown in FIG. 4.

Said plate 1 also carries the other mechanical components of the read out device, only some of which have been shown as not forming a substantial part of the invention.

Figure 4:
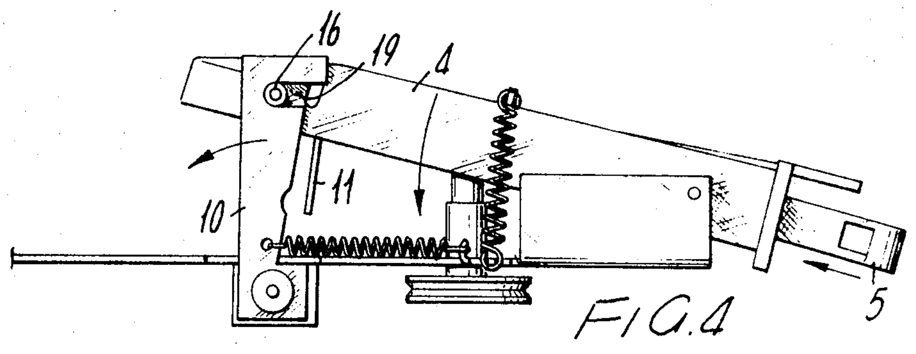
FIG. 4 is a side view of FIG. 3.

The operation of the read out device according to the invention is simple and as follows: assume that the read out device is at the state as shown in FIG. 4, that is where the frame 4 is raised. When inserting a cartridge 5 and thoroughly pushing the same, the inner end edge thereof will abut the arm 11 of the hooking swinging member causing it to rotate rearwardly (in counterclockwise direction as seen in FIG. 4) so that said roller 16, sidewise as carried by frame 4, moves out of the seat 19 for arm 10 of the hooking member.

Once roller 16 has been released from seat 19, the roller can freely slide along the edge 17 of arm 10 and thus said spring 7, which has been previously loaded during a cartridge removal, exerts a downward pull on frame 4 which will be placed at its lower position shown in FIG. 2.

During this downward movement for frame 4, said hooking member rotates rearwardly (in counterclockwise direction in the drawings) to the position shown in FIG. 2 loading spring 13 and roller 16 inserts in notch 18, retaining the assembly at the position shown. At the same time, the read out device is operated to read or reproduce the magnetic tape in the cartridge in any known manner.

In order to eject a previously inserted cartridge, all that is now necessary is to manually act upon the projection 6 of frame 4, pushing the same downwardly so that it will rotate in a clockwise direction, or upwards according to FIG. 2, to bring it to its upper position in FIG. 4. During this movement, said hooking member, as biased by spring 13, is caused to rotate forward, clockwise according to the drawings, and the same acts by its arm 11 upon the cartridge 5 pushing the same outwardly; at the same time, said spring 7 is loaded and the tape read out means stopped.

From the foregoing and as shown in the appended drawings it will be appreciated that a tape read out device has been provided in an extremely simple manner, in which the operation has been made easier, since it is no longer required to act upon a pushbutton to eject a cartridge as otherwise necessary in presently used tape read out devices.

What is claimed is:

1. A tape read out device, such as adapted to be automatically operated by inserting a cartridge containing a recorded magnetic tape, comprising a support frame having an insertion end for a cartridge, a support plate for said frame, said frame pivoted adjacent its cartridge inserting end to said support plate so that it can be rotated, by a simple downward manual pressure at its said end, between a lower position where the cartridge is completely inserted and an upper position for said cartridge insertion or removal, a first spring urging said frame towards the lower position; the device also comprising a pivotable means on said plate for hooking the frame at its said two positions and being simultaneously effective to provide for ejecting an inserted cartridge.

2. A tape read out device as claimed in claim 1, wherein said hooking swinging member comprises an inverted U element, having a first arm sidewise pivoted to said support plate and a second arm entering the frame through a suitable aperture; the second arm of the hooking member being engaged by the inner end edge of an inserted cartridge for the device operation, said first arm being provided with stop seats for the frame at its two end positions engaging with a member projecting sidewise of said frame; said hooking member being subjected to the return action of a resilient means being effective to rotate it to its forward or engaging position for the frame to its upper position.

3. A tape read out device as claimed in claim 1, wherein said frame is provided with a projecting portion at its cartridge insertion end, which is manually acted upon by a slight downward pressure to rotate the frame to its upper or ejection position for an inserted cartridge; said frame being subjected to the spring return action of a resilient means being effective to hold it at its lower position.

* * * * *